(12) United States Patent
Ishizaki et al.

(10) Patent No.: US 9,696,976 B2
(45) Date of Patent: Jul. 4, 2017

(54) METHOD FOR OPTIMIZING PROCESSING OF CHARACTER STRING DURING EXECUTION OF A PROGRAM, COMPUTER SYSTEM AND COMPUTER PROGRAM FOR THE SAME

(75) Inventors: Kazuaki Ishizaki, Kanagawa (JP); Kiyokuni Kawachiya, Kanagawa (JP); Kazunori Ogata, Kanagawa-Ken (JP)

(73) Assignee: International Business Machines Corporation, Armonk, NY (US)

( * ) Notice: Subject to any disclaimer, the term of this patent is extended or adjusted under 35 U.S.C. 154(b) by 1666 days.

(21) Appl. No.: 12/787,500

(22) Filed: May 26, 2010

(65) Prior Publication Data
US 2010/0306741 A1 Dec. 2, 2010

(30) Foreign Application Priority Data
May 29, 2009 (JP) .................................. 2009-131016

(51) Int. Cl.
*G06F 9/44* (2006.01)
*G06F 9/45* (2006.01)

(52) U.S. Cl.
CPC ............ *G06F 8/443* (2013.01); *G06F 8/4434* (2013.01); *G06F 8/4441* (2013.01)

(58) Field of Classification Search
CPC ..... G06F 8/443; G06F 8/4441; G06F 17/2264
USPC ................................................ 717/100, 119
See application file for complete search history.

(56) References Cited

U.S. PATENT DOCUMENTS

| | | | | | |
|---|---|---|---|---|---|
| 4,556,951 | A | * | 12/1985 | Dickman et al. | 712/223 |
| 5,493,675 | A | * | 2/1996 | Faiman et al. | 717/151 |
| 5,561,421 | A | * | 10/1996 | Smith et al. | 341/51 |
| 6,523,168 | B1 | * | 2/2003 | Arnold et al. | 717/116 |
| 7,055,155 | B2 | * | 5/2006 | Otsuka et al. | 719/316 |
| 7,444,021 | B2 | * | 10/2008 | Napper | 382/186 |
| 2001/0054031 | A1 | * | 12/2001 | Lee et al. | 705/406 |
| 2005/0108697 | A1 | * | 5/2005 | Ogasawara et al. | 717/152 |
| 2005/0231397 | A1 | * | 10/2005 | Koseki et al. | 341/50 |
| 2007/0139233 | A1 | * | 6/2007 | Matsuda | 341/50 |
| 2008/0028101 | A1 | * | 1/2008 | Dewa | 709/246 |
| 2008/0288549 | A1 | * | 11/2008 | Rabetge et al. | 707/200 |
| 2009/0249292 | A1 | * | 10/2009 | Tatsubori et al. | 717/114 |

FOREIGN PATENT DOCUMENTS

| | | |
|---|---|---|
| JP | 61-224033 A | 10/1986 |
| JP | 2008-059279 A | 3/2008 |

* cited by examiner

*Primary Examiner* — Wei Zhen
*Assistant Examiner* — Brahim Bourzik

(57) ABSTRACT

A method, computer system and computer program for optimizing the processing of a character string during execution of the program by using characteristic information that indicates a characteristic of the character string and is associated with the character string. The method includes the steps of determining, on the basis of a characteristic of a first character string and operation for the first character string, a characteristic information of at least one of the first character string and a second character string obtained as a result of the operation, and associating the characteristic information with the at least one character string.

19 Claims, 13 Drawing Sheets

210

211 {
```
//CASE WHERE TWO CHARACTER STRINGS ARE CONCATENATED
int mergeAttr(int attr1, int attr2) {    //RESULT IS COMPUTABLE BY BITWISE OR
    return attr1 | attr2;    //(VALUE IS DESIDE SO THAT RESULT CAN BE COMPUTABLE IN THIS MANNER)
}
```

212 {
```
//CASE WHERE CHARACTER THAT BELONGS TO CERTAIN CHARACTER SET IS DELETED FROM INPUT CHARACTER STRING,
//BUT ALL OF THE CHARACTERS ARE NOT NECESSARILY DELETED
int deleteAttrPartial(int attr1, int attr2) {
    return attr1;    //DELETED CHARACTER THAT BELONGS TO CHARACTER SET MAY STILL REMAIN IN RESULT
                     //ACCORDINGLY, CHARACTERISTIC INFORMATION IS NOT CHANGED
}
```

213 {
```
//CASE WHERE ALL CHARACTERS THAT BELONG TO CERTAIN CHARACTER SET ARE DELETED FROM INPUT CHARACTER STRING
int deleteAttrComplete(int attr1, int attr2) {
    return attr1 & attr2;    //CHARACTER THAT BELONGS TO DELETION TARGET CHARACTER SET IS NOT INCLUDED
                              // IN RESULT ACCORDINGLY, CORRESPONDING BIT IS SET TO 0
}
```

FIG. 2B

```
                                                401
┌─────────────────────────────────────┐
│ String s = new String("ABC");       │
│ String t = s.toUpperCase();         │
└─────────────────────────────────────┘
```

FIG. 4A

```
                                                451
┌─────────────────────────────────────┐
│ String s1 = new String("ABC");      │
│ String s2 = new String("XYZ");      │
│ String t = s1.concat(s2);           │
└─────────────────────────────────────┘
```

FIG. 4F

```
class java.lang.String {
...
//IN REALITY, USE REFLECTION OR SPECIAL CALL BY JIT IN ORDER TO ACCESS FOLLOWING String CLASS
Static intHAS_REGEX_SPECIAL = String.HAS_REGEX_SPECIAL; //0x10
Static intHAS_REGEX_NORMAL = String.HAS_REGEX_NORMAL; //0x20
Static intMASK_REGEX_ATTR = HAS_REGEX_SPECIAL | HAS_REGEX_NORMAL;

public String replaceFirst(String expr, String substitute) {
  int attr = expr.attr; //IN REALITY, USE REFLECTION OR SPECIAL CALL BY JIT if ((attr & MASK_REGEXP_ATTR) != 0 &&
      (attr & HAS_REGEXP_SPECIAL) == 0 ) { //CHECK IF OPTIMIZATION USING CHARACTERISTIC INFORMATION IS POSSIBLE
    //OPTIMIZED VERSION: IF NO SPECIAL CHARACTER OF URL ENCODING EXISTS, RETURN s WITHOUT ANY PROCESSING
    int index = this.indexOf(expr); //SEARCH FOR LOCATION WHERE expr APPEARS
    if (index == -1) return new String(this); //IF NO expr APPEARS, NO REPLACEMENT OCCURS. ACCORDINGLY, RETURN COPY
    return substring(0, index) + substitute + substring(index + expr.length());
    //IF expr APPEARS, CONCATENATE FRONT AND BACK CHARACTER STRING PORTION OF expr AND ARGUMENT substitute, AND RETURN
  } else {
    //ORIGINAL VERSION
    Pattern pattern = Pattern.compile(expr); //COMPILING OF PATTERN IS HEAVY PROCESSING THAT GENERATES LARGE NUMBER OF OBJECTS
    Matcher matcher = pattern.matcher(this);
    return matcher.replaceFirst(substitute);
  }
}
...
```

```
class Matcher {
    static int N_STATE = 2;         //NUMBER OF STATE OTHER THAN ACCEPTING STATE
    static int ST_INITIAL = 0;      //INITIAL STATE
    static int ST_ALPHA = 1;        //STATE 1
    static int ST_SUCCESS = -1;     //PATTERN MATCH SUCCEEDS
    static int ST_FAIL = -2;        //PATTERN MATCH FAILS int xfer[N_STATE][256] = {      //MAPPING TABLE BETWEEN INPUT VALUES
                                    //AND STATE NUMBERS AFTER TRANSITION OF STATE
    //STATE TRANSITION TABLE FROM INITIAL STATE
    { ST_INITIAL /* ¥0x00 */, ST_INITIAL /* ¥0x01 */, ... ,
        ST_ALPHA /* 'a' */, ST_ALPHA /* 'b' */, ... , ST_ALPHA /* 'z' */,
        ST_INITIAL /* '{' */, ... , ST_INITIAL /* ¥0xff */ },
    //STATE TRANSITION TABLE FROM STATE 1
    { ST_FAIL /* ¥0x00 */, ST_FAIL /* ¥0x01 */, ... ,
        ST_SUCCESS /* '0' */, ST_SUCCESS /* '1' */, ... , ST_SUCCESS /* '9' */,
        ST_FAIL /* ':' */, ... , ST_FAIL /* ¥0xff */ }}, boolean stateMachine(String s) {   //METHOD TO CHECK IF GIVEN CHARACTER STRING
                                       //MATCHES [a-z]+[0-9]
        int state = ST_INITIAL;        //INITIALIZE VARIABLE INDICATING STATE IN INITIAL STATE
        for (i = 0; i < s.length(); i++) {
            state = xfer[state][s.charAt(i)];  //FIND NEXT STATE FROM i-th CHARACTER
            if (state < 0) break;      //END WHEN STATE BECOMES NEGATIVE VALUE
        }
        return (state == ST_SUCCESS);
    }
}
```

432

```
class Matcher {
    static int N_STATE = 2;         //NUMBER OTHER THAN ACCEPTING STATE
    static int ST_INITIAL = 0;      //INITIAL STATE
    static int ST_ALPHA = 1;        //STATE 1
    static int ST_SUCCESS = -1;     //PATTERN MATCH SUCCEEDS
    static int ST_FAIL = -2;        //PATTERN MATCH FAILS boolean stateMachine(String s) {   //METHOD TO CHECK IF GIVEN CHARACTER STRING
                                       //MATCHES [a-z]+[0-9]
        int state = ST_INITIAL;        //INITIALIZE VARIABLE INDICATING STATE IN INITIAL STATE
        for (i = 0; i < s.length(); i++) {
            char c = s.charAt(i);
            switch(state) {
            case ST_INITIAL; if (c >= 'a' && c <= 'z') state = ST_ALPHA;
                             break;
            case ST_ALPHA;   if (c >= 'a' && c <= 'z')      state = ST_ALPHA;
                             else if (c >= '0' && c <= '9') state = ST_SUCCESS;
                             else                           state = ST_FAIL;
                             break;
            }
            if (state < 0) break;      //END WHEN STATE BECOMES NEGATIVE VALUE
        }
        return (state == ST_SUCCESS);
    }
}
```

FIG. 4D

```
class java.net.URLDecoder {
...
//IN REALITY, USE REFLECTION OR SPECIAL CALL BY JIT IN ORDER
//TO ACCESS FOLLOWING String CLASS
Static int HAS_URL_SPECIAL = String.HAS_URL_SPECIAL; // 0x10
Static int HAS_URL_NORMAL = String.HAS_URL_NORMAL; // 0x20
Static MASK_URL_ATTR = HAS_URL_SPECIAL | HAS_URL_NORMAL;

public static String decode(String s, String enc) {
    int attr = s.attr; //IN REALITY, USE REFLECTION OR SPECIAL CALL BY JIT if ((attr &MASK_URL_ATTR)    != 0 &&
        (attr & HAS_URL_SPECIAL) ==0) //CHECK IF OPTIMIZATION USING
                                      //CHARACTERISTIC INFORMATION IS POSSIBLE
    return s;      //OPTIMIZED VERSION: IF NO SPECIAL CHARACTER OF URL ENCODING EXISTS,
                   //RETURN s WITHOUT ANY PROCESSING //ORIGINAL VERSION
    boolean needToChange = false;
    int numChars = s.length();
    StringBuffer sb = new StringBuffer(numChars > 500 ? numChars / 2 : numChars);
    while (i < numChars) {
        c = s.charAt(i);
        switch (c) {
        case '+':  sb.append(' '); i++;
                   needToChange = true; break;
        case '%': while (((i+2) < numChars) && (c=='%')) {
                    //CONVERT CONTINUOUS "%xy" INTO EIGHT-BIT INTEGER
                    //AND COPY THEM TO byte bytes[]
                  }
                  sb.append(newString(byte, 0, pos, enc)) {
                    needToChange = true;   break;
        default:  sb.append(c);  i++; break;
        }
    }
    if ((attr & MASK_URL_ATTR) == 0) {  //IF CHARACTERISTIC INFORMATION OF ARGUMENT s IS UNCHECKED,
        if (needToChange)   s.attr |= HAS_URL_SPECIAL;   //ADD CHARACTERISTIC INFORMAITON TO s HERE
        else                s.attr |= HAS_URL_NORMAL;
    }
    // return (needToChange? sb.toString() : s);  //ORIGINAL CODE
        if (!needToChange)
            return s;
        String t = sb.toString();    //VALUE OF t.attr AT THIS POINT IN TIME IS 0
        t.attr |= HAS_URL_NORMAL;    //SET CHARACTERISTIC INFORMATION SINCE NO SPECIAL
                                     //CHARACTER OF URL ENCODING IS INCLUDED
        return t;
}
```

METHOD FOR OPTIMIZING PROCESSING OF CHARACTER STRING DURING EXECUTION OF A PROGRAM, COMPUTER SYSTEM AND COMPUTER PROGRAM FOR THE SAME

CROSS-REFERENCE TO RELATED APPLICATIONS

This application claims priority under 35 U.S.C. §119 from Japanese Patent Application No. 2009-131016 filed May 29, 2009, the entire contents of which are incorporated herein by reference.

BACKGROUND OF THE INVENTION

1. Field of the Invention

The present invention relates to a method for optimizing processing of a character string during execution of a program, a computer system and a computer program for the same.

2. Description of the Related Art

In the class libraries of many programming languages, classes for retaining character strings (hereinafter, referred to as character string classes) are prepared as standard classes. By utilizing the abundant class libraries prepared in the system, a programmer completes programming work with higher productivity. The classes prepared in the class libraries, however, are made for general purposes. Accordingly, a program with high execution efficiency is not always produced by use of the aforementioned classes.

In Java (trademark) language, for example, java.lang.String class (hereinafter, referred to as String class) is prepared as one of the character string classes. In String class, replaceFirst( ) method is prepared. The replaceFirst( ) method replaces a portion in a character string, which matches a specified regular expression, with a different character string. The regular expression specified in the replaceFirst( ) method does not always include a regular expression metacharacter. A regular expression not including a metacharacter "set" may be specified, for example. According to this specification, the character string "set" is thus replaced with a character string "get," for example.

The aforementioned replacement can be also implemented by combining String.indexOf( ) method and String.substring( ) method, for example. When the replacement is implemented by the aforementioned combination, the execution speed of the program is faster than in the case where the replacement is implemented by the replaceFirst( ) method. Meanwhile, the productivity and the general-purpose properties of the program are lower than in the case where the replaceFirst( ) method is implemented.

When the priority is given to the execution speed of the program, a programmer may employ a method of writing codes by selectively using either one of the replaceFirst( ) method and the aforementioned combination depending on whether or not the regular expression includes a metacharacter, for example. However, in a case where whether the regular expression includes a metacharacter is not determined until execution of the program, it is not realistic for the programmer to prepare both the implementation using the replaceFirst( ) method and the implementation using the aforementioned combination, and to maintain both the implementations.

Programmers improve the productivity of programming work by utilizing the character string classes prepared in the system. However, since the character string classes are made for general purposes, a program with high execution efficiency is not always produced. In this respect, a technique for producing a program with high execution efficiency without lowering the productivity of the program is in demand.

SUMMARY OF THE INVENTION

Accordingly, an aspect of the present invention provides a method of optimizing processing of a character string during execution of a program. Based on a characteristic of a first character string and an operation for the first character string, a characteristic information is determined of at least one of the first character string and a second character string obtained as a result of the operation. The characteristic information is associated with the at least one character string.

A second aspect of the present invention provides a computer system that executes a program that optimizes the processing of a character string during execution of the program by using characteristic information that indicates a characteristic of the character string and is associated with the character string. The characteristic information is determined as associated with the character string according to the method described above.

A third aspect of the present invention provides a computer program product tangibly embodying computer readable instructions for processing of a character string. The computer program product causing a computer system to execute the steps of the method described above.

BRIEF DESCRIPTION OF THE DRAWINGS

For a more complete understanding of the present invention and the advantage thereof, reference is now made to the following description taken in conjunction with the accompanying drawings.

FIG. 2B shows an implementation example for propagating the characteristic information included in the character string object shown in FIG. 1 to a different character string object in the embodiment of the present invention.

FIG. 4A shows a program code for describing an example of Example 1 in the embodiment of the present invention.

FIG. 4B shows a program code for describing an example of Example 2 in the embodiment of the present invention.

FIG. 4D shows a program code for describing an example of Example 3 in the embodiment of the present invention.

FIG. 4E shows a program code for describing an example of Example 4 in the embodiment of the present invention.

FIG. 4F shows an example of a program code for implementing the processing of the flowchart shown in FIG. 3A in the embodiment of the present invention.

DETAILED DESCRIPTION OF THE PREFERRED EMBODIMENT

Figure 1:
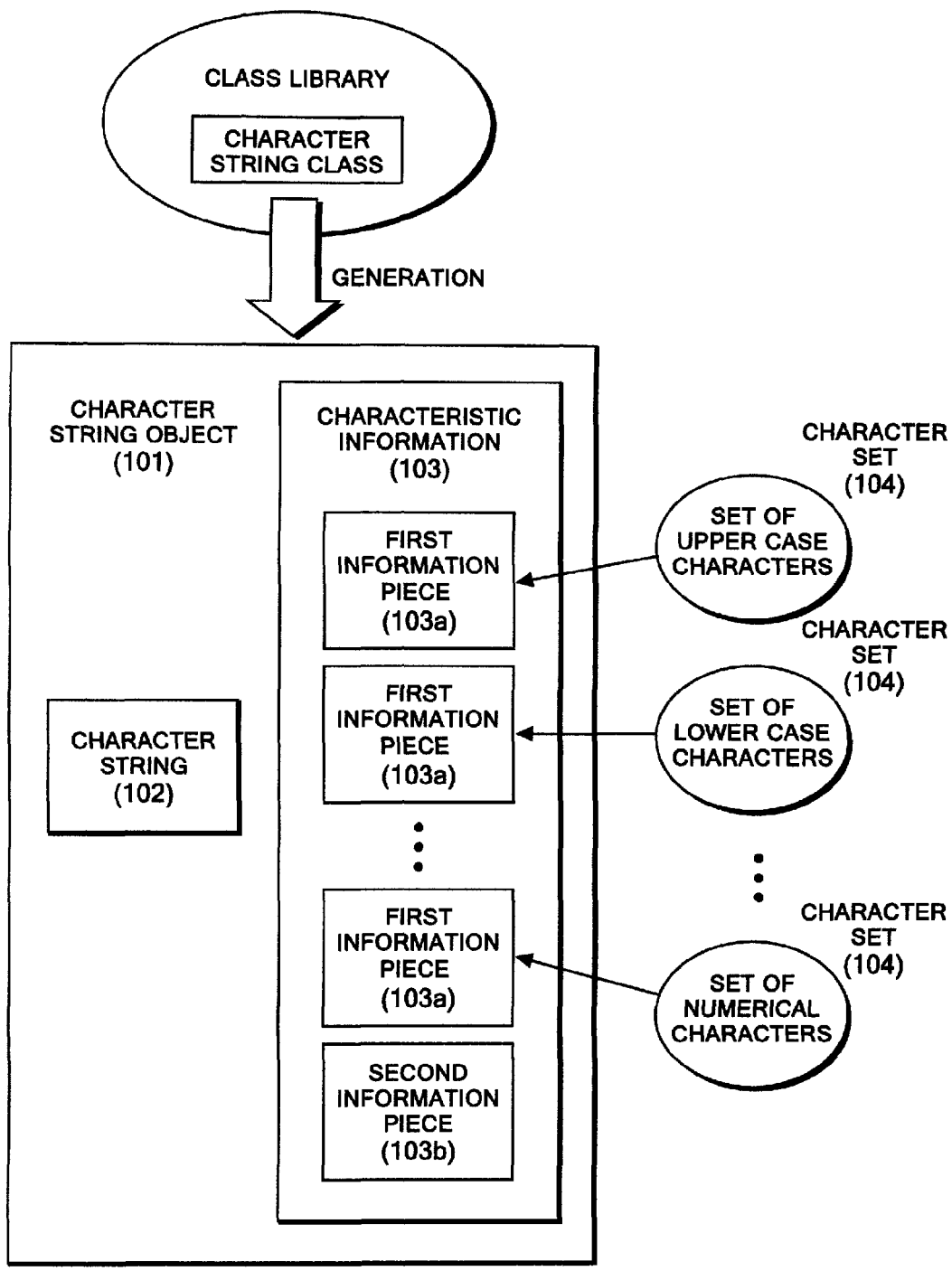
FIG. 1 shows a structure of a character string object implemented in Java (trademark) in an embodiment of the present invention.

With reference to the drawings, the preferred embodiment of the present invention will be described in detail below. In an embodiment of the present invention, a "character string" refers to a series of one or more characters. The character is character data of a character code used as a character expression in a program. The character code is EUC-JP, Shift_JIS or UTF-8, for example, but the character code is not limited to these types. In addition, the character may be a character having a meaning such as a tab character, a new line character, an escape character or a regular expression special character. The regular expression special character is a character used to collectively express a certain character string pattern. The regular expression special character is, for example, "+" representing repetition of at least once, "[" and "]" representing the start and end of a character range specification, respectively, in the regular expression "[a-z]+[0-9]," but the regular expression special character is not limited to the aforementioned characters.

In the embodiment of the present invention, a "program including processing of a character string" is a program that executes some kind of processing for a character string during execution of the program. In addition, the aforementioned processing includes processing for a variable, structure or object in which the character string is stored, for example. The aforementioned processing is, for example, processing to generate a character string, processing to duplicate a character string, processing to search for any character included in a character string, processing to convert any character included in a character string into a different character, processing to extract any character from a character string, processing to concatenate character strings, processing to compare character strings or processing to acquire information on a character string, but the processing is not limited to the aforementioned processing types.

In the embodiment of the present invention, "a characteristic of a character string" refers to a characteristic of at least one character included in a character string. Examples of the aforementioned characteristic include the aforementioned character being an upper case character, a lower case character, a numerical character and a double-byte character such as a Japanese character and Chinese character. In addition, examples of the characteristic include the aforementioned character being a an alphabet character, a character of the same type of character code, a regular expression special character, a character that can be expressed by eight-bit, a special character in URL encode and a character other than the characters of the aforementioned examples. However, the characteristic is not limited to the aforementioned examples.

In the embodiment of the present invention, a "character set" refers to a set of characters having the aforementioned characteristic in common. For example, the character set may be a set of upper case characters, lower case characters, numerical characters, double-byte characters, alphabet characters, characters of the same type of character code, regular expression special characters, characters that can be expressed by eight-bit, special characters in URL encode, or characters that do not belong to a certain set of characters. However, the character set is not limited to the aforementioned character sets. Multiple character sets having characters that are all different from each other may be collectively expressed as one character set.

In the embodiment of the present invention, "characteristic information" refers to an information piece indicating a characteristic of a character string. The characteristic information is prepared for each character string. The characteristic information at least include: a first information piece indicating that the character string includes a character which belongs to a character set, that the character string does not include a character which belongs to a character set, or that whether or not the character string includes the character is unknown; and a second information piece indicating that the aforementioned character string includes a character which does not belong to the character set, that the character string does not include a character which does not belong to a character set, or that whether or not the character string includes the character is unknown.

In the embodiment of the present invention, "to optimize processing of a character string" refers to processing that the computer system executes when executing processing of a character string in a case where the processing of a character string includes multiple processing operations. In this case, the computer system selects processing with high execution efficiency in accordance with the characteristic information of the character string from the multiple processing operations and then executes the processing. The processing with high execution efficiency to be performed in accordance with the characteristic information of the character string is as follows. For example, in a case where first processing is applicable to any character string, and second processing is applicable to only a character string with which certain characteristic information is associated, the second processing that can be executed at high speed as compared with the first processing and that can obtain the same result as that of the first processing is considered to be the processing with high execution efficiency in accordance with the characteristic information of the character string. The processing with high execution efficiency in accordance with the characteristic information of the character string, however, is not limited to this case. The optimized processing includes the processing with high execution efficiency in accordance with the characteristic information of a character string.

In the embodiment of the present invention, "operation for a character string" is some kind of operation for a character string to be executed in a program or for an area where the character string is stored. The operation for a character string to be executed in the aforementioned program refers to, for example, generation of a character string, duplication of a character string, search for any character included in a character string, conversion of a character included in a character string into another character, extraction of any character from a character string, concatenation of character strings, comparison of character strings or acquisition of information on a character string. However, the operation is not limited to these examples. An example of the processing for the area where a character string to be executed in a program is stored is to secure a memory area to which the character string is assigned, for example, but the processing is not limited to this.

In the embodiment of the present invention, "to perform sequential processing of a character string character by character" refers to execution of individual processing, by a computer system, for each character included in a character string. For example, in the processing to search for a certain character from a character string, in a case where a computer system checks all of the characters included in the character string and determines that all characters found as the certain character are the search results, the search processing is considered as the sequential processing of a character string character by character. On the other hand, in a case where the computer system stops the search processing as soon as the computer system finds the first search target character and shows the found character as the search result, without further checking the remaining characters in the character string, the search processing is not considered as the sequential processing of a character string character by character.

In the embodiment of the present invention, "checking of characters to be sequentially processed" refers to finding of a characteristic of each character. Examples of the characteristic of each character include an upper case character, a lower case character, a numerical character, a double-byte character, an alphabet character, a character of the same type of character code, a regular expression special character, a character that can be expressed by eight-bit, a special character in URL encode or a character other than the aforementioned characters. However, the characteristic is not limited to the aforementioned examples.

Hereinafter, a description will be given of the embodiment of the present invention with reference to drawings. It is to be understood that the embodiment is provided for describing a preferred mode of the present invention and not intended to limit the scope of the invention to the embodiment shown herein. In addition, unless specified otherwise, identical elements are denoted by the same reference numerals throughout the drawings.

Note that, hereinafter, the description will be given of an example of a case where the embodiment of the invention is implemented in Java (trademark). In Java (trademark), the operation of a character string is executed through a character string object. Accordingly, a character string in scope of claims refers to the character string object itself or a character string included in the character string object in Java (trademark).

FIG. 1 shows a structure of a character string object in a case where the embodiment of the present invention is implemented in Java (trademark).

A character string object (101) includes a character string (102) and characteristic information (103). Note that, the characteristic information (103) may be included in an area different from the character string object (101) on a memory associated with the aforementioned character string object (101). The character string object (101) is stored in a memory. The character string object (101) is generated from a character string class prepared in a class library. The class library refers to a Java (trademark) class library in Java (trademark) environment, for example, but the class library is not limited to this. The character string class refers to java.lang.String class (String class) in Java (trademark), for example, but the character string class is not limited to this.

The character string (102) is character string data which includes at least one character and which is invariable or variable. The invariable character string refers to a character string that does not change until the character string object (101) is released. The variable character string refers to a character string that may change until the character string object (101) is released.

The characteristic information (103) is information showing what characteristic the character included in the character string (102) has. The characteristic refers to the character being an upper case character, a lower case character or a numerical character or combination of these characteristics, for example, but the characteristic is not limited to these examples. The characteristic information (103) includes first information pieces (103a) and second information pieces (103b). Each of the first information pieces (103a) indicates that the character string (102) includes a character which belongs to a character set (104), that the character string (102) does not include the character which belongs to the character set (104) or that whether or not the character string (102) includes the character is unknown. Each of the second information pieces (103b) indicates that the character string (102) includes a character which does not belong to the character set (104), that the character string (102) does not include the character which does not belong to the character set (104) or that whether or not the character string includes the character is unknown. Each of the character sets (104) is a set of characters having the same characteristic. The character set (104) is, for example, a set of upper case characters, lower case characters or numerical characters or characters having combination of these characteristics. However, the character set (104) is not limited to the aforementioned sets of characters. For example, multiple character sets including characters that are all different from each other may be collectively expressed as one character set.

The characteristic information (103) may be stored in a different position on a memory, which is associated with the character string object (101).

The characteristic information (103) is used to make a judgment to execute high-speed processing in a method for processing the character string object (101).

The characteristic information (103) shows any of Cases 1 to 4 below, for example, by use of a combination of the first information piece (103a) and the second information piece (103b).

Case 1. All of the characters included in the character string (102) belong to the character set (104). In Case 1, the first information piece (103a) shows that the character string (102) includes a character which belongs to the character set (104). The second information piece (103b) shows that the character string (102) does not include a character which does not belong to the character set (104).

Case 2. All of the characters included in the character string (102) do not belong to the character set (104). In Case 2, the first information piece (103a) shows that the character string (102) does not include a character which belongs to the character set (104). The second information piece (103b) shows that the character string (102) includes a character which does not belong to the character set (104).

Case 3. The character string (102) includes both of a character which belongs to the character set (104) and a character which does not belong to the character set (104). In Case 3, the first information piece (103a) shows that the character string (102) includes a character which belongs to the character set (104). The second information piece (103b) shows that the character string (102) includes a character which does not belong to the character set (104).

Case 4. The characters included in the character string (102) are unchecked. In Case 4, the first information piece (103a) shows that whether or not the character string (102)

includes a character which belongs to the character set (104) is unknown. The second information (103*b*) shows that whether or not the character string (102) includes a character which does not belong to the character set (104) is unknown.

The characteristic information (103) may be expressed by a bit string.

Each of the bits in the bit string corresponds to the first information piece (103*a*) or the second information piece (103*b*). The bit corresponding to the first information piece (103*a*) may indicate that the character string (102) includes a character which belongs to the character set (104) by "1," and indicate that the character string (102) does not include a character which belongs to the character set (104) or that whether or not the character string (102) includes the character is unknown by "0." The bit corresponding to the second information piece (103*b*) may indicate that the character string (102) includes a character which does not belong to the character set (104) by "1," and indicate that the character string (102) does not include a character which does not belong to the character set (104) or that whether or not the character string (102) includes the character is unknown by "0."

In a case where the first information piece (103*a*) and the second information piece (103*b*) are expressed by use of bits, Cases 1, 2, 3 and 4 above are expressed by "10," "01," "11" and "00," respectively.

In the aforementioned example in which the characteristic information is expressed by bits, multiple character sets may be collectively handled in a case where characters included in each of the multiple character sets are exclusive. In the case where the multiple character sets are collectively handled, one bit is assigned to each of the character sets as the first information piece (103*a*). In addition, one bit is assigned to a set of characters that do not belong to any of the character sets as the second information piece (103*b*).

For example, a set of upper case characters (hereinafter, referred to as an upper case character set), a set of lower case characters (hereinafter, referred to as a lower case character set), and a set of numerical characters (hereinafter, referred to as a numerical character set) are mutually exclusive sets of characters. Accordingly, as the first information pieces, one bits may be assigned to the upper case character set, the lower case character set and the numerical character set, respectively. In addition, one bit may be assigned to a set of characters that are neither of an upper case character, a lower case character nor a numerical character (hereinafter, referred to as other character set) as the second information piece. As a result of the aforementioned bit assignment, the characteristic information (103) is expressed by a total of four bits including three bits corresponding to the first information pieces, respectively, and one bit corresponding to the second information piece. In the following examples, the aforementioned four bits are shown by the order of bit strings corresponding to upper case character information, the lower case character information, the numerical character set and the other character set, respectively, from the right direction.

The characteristic information "0001" indicates that the character string includes an "upper case character."

The characteristic information "0010" indicates that the character string includes a "lower case character."

The characteristic information "0100" indicates that the character string includes a "numerical character."

The characteristic information "1000" indicates that the character string includes a "character other than upper case, lower case and numerical characters (hereinafter, referred to as the other character)."

Note that, the number of bits "1" is not limited to one. For example, characteristic information "1110" indicates that the character string includes "a lower case character, a numerical character and the other character."

The computer system can reduce the number of bits used to express the characteristic information by collectively handling multiple character sets as compared with a case where the multiple character sets are not handled collectively.

In the aforementioned example, four bits are required in a case where the multiple character sets are handled collectively. On the other hand, in a case where the multiple character sets are not handled collectively, two bits are required to express one character set as shown in the example of Cases 1 to 4. Accordingly, when the multiple character sets are not handled collectively, the number of bits required for three character sets including the upper case character set, the lower case character set and the numerical character set is two bits×three=six bits.

Figure 2A:
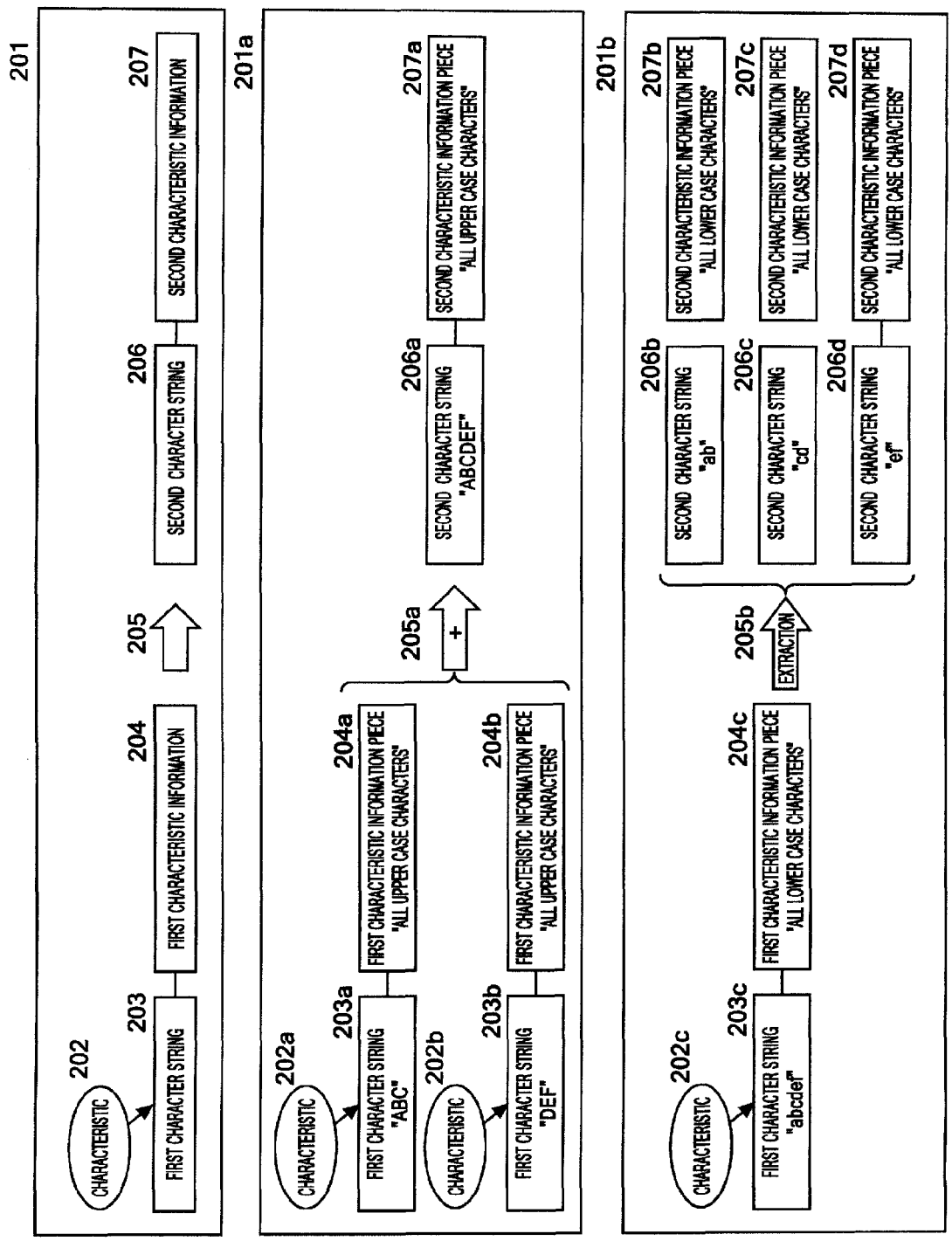
FIG. 2A is a diagram for describing how characteristic information shown in FIG. 1 is determined in the embodiment of the present invention.

FIG. 2A is a diagram for describing how the characteristic information shown in FIG. 1 is determined in the embodiment of the present invention.

The computer system determines, on the basis of a characteristic (202) of a first character string (203) and operation (205) for the first character string, characteristic information (204 or 207) of at least one character string of the first character string (203) and a second character string (206) which is the result of the operation (205).

The characteristic (202) of the first character string may be already determined and then saved as the first characteristic information (204), or the characteristic of the first character string may be found by checking of the characters of the first character string (203) by the computer system, for example. In a case where the characteristic (202) of the first character string is found by the computer system, the computer system determines that the found characteristic is the first characteristic information (204).

The first character string (203) is a character string that is a target for the operation (205). The first character string (203) may be one character string or multiple character strings. As shown in Specific Example 1 (201*a*), in a case where the operation (205) performs processing to concatenate a character string "ABC" (203*a*) and a character string "DEF" (203*b*), for example, the character string "ABC" (203*a*) and the character string "DEF" (203*b*) correspond to the first character string (203).

The first characteristic information (204) is the information associated with the first character string (203). The first characteristic information (204) may be a characteristic already associated with the first character string (203), or a characteristic which is found by checking of the characters of the first character string (203) by the computer system and thus determined as the first characteristic information (204).

Examples of the processing to be performed by the operation (205) include generation of a character string, duplication of a character string, search for any character included in a character string, conversion of a character included in a character string into another character, extraction of any character from a character string, concatenation of character strings, comparison of character strings and acquisition of information on a character string. The processing performed by the operation (205), however, is not limited to these examples.

The second character string (206) is a character string in which the result of the aforementioned operation is stored. As shown in Specific Example 1 (201*a*), in a case where the operation (205) performs the processing to concatenate the character string "ABC" (203*a*) and the character string "DEF" (203*b*), a character string "ABCDEF" (206*a*), which is the result of the concatenation of the character strings, corresponds to the second character string (206). The second character string (206) may be one character string or multiple character strings. As shown in Specific Example 2 (201*b*), in a case where the operation (205) performs processing to extract character strings each having two characters from a character string "abcdef" (203*c*), for example, a character string "ab" (206*b*), a character string "cd" (206*c*) and a character string "ef" (206*d*), which are the results of the extraction, correspond to the second character strings, respectively.

The second characteristic information (207) is the information associated with the second character string (206). The second characteristic information (207) may be determined on the basis of the characteristic (202) of the first character string and the operation (205).

In Specific Example 1 (201*a*), first characteristic information pieces (204*a* and 204*b*) indicate "all upper case characters." Accordingly, characteristics (202*a* and 202*b*) also indicate "all upper case characters." In operation (205*a*) to concatenate the character strings of the "all upper case characters," the character string resulting from the operation is also "all upper case characters." Accordingly, a second characteristic information piece (207*a*) is determined as "all upper case characters."

In Specific Example 2 (201*b*), a first characteristic information piece (204*c*) indicates "all lower case characters." Accordingly, a characteristic (202*c*) also indicates "all lower case characters." In operation (205*b*) to extract character strings from a character string of "all lower case characters," the character strings resulting from the operation are also "all lower case characters." Accordingly, second characteristic information pieces (207*b* to 207*d*) may be determined as "all lower case characters."

The aforementioned determination is executed at timings shown in First to Third Modes during execution of the program. According to the aforementioned determination, the determined characteristic information is added to the character string object (101 in FIG. 1). Because of the addition of the characteristic information, the character string and the characteristic information are associated with each other.

A. First Mode

The characteristic information (103 in FIG. 1) may be added to the character string object (101) in accordance with generation of the character string object (101) from a character string class. In a case where characteristic information of the character string (102 in FIG. 1) included in the character string object (101) to be generated can be determined from the character string object (101), which is the generation source, or the characteristic information can be checked simultaneously with the sequential processing for the generation source character string, the computer system adds the characteristic information (103) found by the determination processing or the checking processing to the generated character string object (101).

The addition of the characteristic information can be performed for both of a character string object retaining a variable character string and a character string object retaining invariable character string. In particular, in the case of the character string object retaining an invariable character string, e.g., a String object in Java (trademark), when the character string object (101) is generated once, the character string included in the character string object (101) does not change. Accordingly, the characteristic information (103) of the character string included in the character string object (101) does not change either. Thus, in a case of the character string object retaining an invariable character string, the computer system can utilize the character string object (101) to which the characteristic information (103) is added in accordance with the generation of the object until the character string object (101) is subjected to garbage collection.

B. Second Mode

The characteristic information (103) may be added to the character string object (101) in a case where the characteristic is checked simultaneously with the sequential processing for the character string (102) included in the character string object (101) to which the characteristic information (103) is not added.

An effect of including the characteristic information (103) in the character string object (101) is that the processing optimized in accordance with the characteristic information (103) is executed. Accordingly, in a case where the optimized processing is not executed even at once for a certain character string object, the cost of aforementioned checking processing is wasted. In order to suppress the aforementioned cost, in a case where the processing to perform sequential processing of the content of a character string character by character is included in a method that processes the character string, the computer system performs the checking of the characteristic simultaneously with the processing.

C. Third Mode

In accordance with the case where the operation of at least one character string object to which the characteristic information (103) is added (hereinafter, referred to as an operation source object) is executed, the characteristic information (103) may be added to at least one character string object in which the result of the operation is stored (hereinafter, referred to as a result object). In accordance with the case where the characteristic information to be added to the result object is determined on the basis of the operation source object and the content of the operation, the computer system adds the determined characteristic information (103) to the result object. The aforementioned operation is processing to concatenate character strings, to extract any character from a character string or to convert a character string into another character string, for example, but the operation is not limited to the aforementioned processing operations.

Hereinafter, Third Mode will be described with an example. An assumption is made that the first character string object includes a first character string of all upper case characters, and the second character string object includes a second character string of all upper case characters, for example.

In a case where the first character string and the second character string are concatenated, the computer system may determine that the character string resulting from the concatenation of the character strings is also formed of all upper case characters. Accordingly, the computer system may set characteristic information, which is to be added to the result object, to be information indicating "all upper case characters," for example.

In a case where a certain character is extracted from the first character string, the computer system may determine the first character string from which a partial character string is extracted (hereinafter, referred to as a first result character string) and the extracted partial character string (hereinafter, referred to as a second result character string) are both formed of upper case characters. The case where a certain character is extracted from the first character string refers to a case where Java (trademark) language String.substring( ) method to extract a partial character string is applied to the first character string object, for example. Accordingly, the computer system may set the characteristic information, which is to be added to the result object including the first result character string and/or the result object including the second result character string, to be the information indicating "all upper case characters," for example. Note that, the result object including the first result character string may be the first character string object.

In a case where the first character string is converted into another character string, e.g., a character string of all lower case characters, the computer system may determine that the converted character string is formed of all lower case characters. Accordingly, the computer system may set the characteristic information, which is to be added to the result object, to be the information indicating "all lower case characters."

FIG. 2B shows an implementation example to transmit the characteristic information included in the character string object shown in FIG. 1 to another character string object in the embodiment of the present invention.

Note that, the addition of the characteristic information to the result object in Third Mode is termed as "transmission of characteristic information to the result object from the operation source object." The aforementioned processing for transmission is determined on the basis of the processing content of the method operating the character string and characteristic information pieces (hereinafter, referred to as attr1, attr2, . . . attrn) included in one or more character string objects (hereinafter, referred to as s1, s2, . . . Sn) which are targets for the processing. Note that, an assumption is made that a bit string is used to express the characteristic information piece. The bit string may be a bit string in which bits are assigned so as to handle multiple character sets collectively, or a bit string in which two bits are assigned to each character set. In most cases, the processing for the aforementioned transmission is one or a combination of at least two of the processing operations indicated by first code (211) to third code (213) shown below.

The processing indicated by the first code (211) is processing to calculate characteristic information to be added to a result object in a case where the character string object to which the characteristic information piece attr1 is added and the character string object to which the characteristic information piece attr2 is added are concatenated. In the processing indicated by the first code (211), the characteristic information to be added to the result object is found by logical summation of the characteristic information piece attr1 and the characteristic information piece attr2.

The processing indicated by the second code (212) is processing to calculate the characteristic information to be added to a result object in a case where a character string included in the character string object to which the characteristic information piece attr2 is added is deleted from a character string included in the character string object to which the characteristic information piece attr1 is added. Here, the character string to be deleted may be a dynamic character string expressed by regular expression, for example. In the processing indicated by the second code (212), there may be a case where a character of the character set corresponding to the characteristic information piece attr2 remains in the character string object to which the characteristic information piece attr1 is added. Accordingly, the characteristic information piece attr1 is set to be the characteristic information to be added to the result object.

The processing indicated by the third code (213) is processing to calculate the characteristic information to be added to a result object in a case where all of the characters in the character string included in the character string object to which the characteristic information piece attr2 is added are deleted from the character string object to which the characteristic information piece attr1 is added. In the processing indicated by the third code (213), the characteristic information to be added to the result object is found by logical product of the characteristic information piece attr1 and the characteristic information piece attr2.

The developer of the class library can determine a combination of the first code to the third code (211 to 213) on the basis of the original processing contents of the method that operates character strings, and then add the processing for the transmission to the program. Because of the addition, the characteristic information is propagated and then added to the result object during execution of the program while the character strings included in the result object are not sequentially checked, for example.

Hereinafter, examples of the codes to be added will be described with three methods of String class in Java (trademark) as examples.

String.concat( ) method is a method for adding a character string to a character string. Accordingly, the code to be added is the first code (211).

String.substring( ) method is a method for extracting a part of a character string. Accordingly, the code to be added is the second code (212).

replaceFirst( ) method is a method for replacing a part of a character string with another. Accordingly, the code to be added is a combination of the first code (211) and the second code (212).

String.toUpper( ) method is a method for converting a lower case character into an upper case character. Accordingly, the code to be added is a combination of the first code (211) and the third code (213).

In a case where a character string object includes specific characteristic information, the computer system causes an optimized version of the code to be executed in each of the aforementioned methods. In a case where a character string object does not include specific characteristic information, the computer system causes a normal version of the code, which is the original and is not optimized, to be executed in each of the aforementioned methods.

In order to operate the program, the normal version of the code is necessary regardless of the presence or absence of the optimized version of the code. The computer system causes the program to be correctly operated by always executing, by use of the normal version of the code, the processing for the character string object to which characteristic information is not added. In addition, in a case where checking of characteristic information are performed simultaneously with the execution of the normal version of the code, the optimized version of the code may be executed in accordance with the characteristic information when the character string object is processed by the aforementioned method for the second time and later.

Hereinafter, examples of variations of the characteristic information to be added to the character string object will be shown. Note that, the variations of the characteristic information are not limited to Examples 1 to 4 below.

Example 1. "Upper case character is not included" and "lower case character is not included"

Example 2. "Regular expression special character string such as * and [ ] is not included"

Example 3. "All characters can be expressed by eight-bit

Example 4. "%" and "+," which are special characters in URL encode, are not included"

In a case where the characteristic information indicates Example 1, the processing to convert a character string into a lower case character or processing to convert a character string into an upper case character may be omitted during execution of String.toLowerCase( ) method or String.toUpperCase( ) method, for example. In addition, in a case where two character strings to be compared have the characteristic information which indicates that "upper case character is not included" or the characteristic information which indicates that "lower case character is not included" during execution of String.compareIgnoreCase( ) method or String.equalsIgnoreCase( ) method, for example, the aforementioned comparison may become a simple comparison of 16-bit values. Here, it does not matter if a character string of the two character strings to be compared has characteristic information which indicates "numerical character is included," and the other character string has characteristic information which indicates "numerical character is not included." Since the aforementioned comparison becomes simple, an increase in the processing speed can be expected. Here, a case where the character strings have the same flag refers to a case where "upper case character is not included" in neither one of the two character strings to be compared, for example.

In a case where the characteristic information indicates Example 2, generation of java.util.regex.Matcher object is unnecessary during execution of replaceFirst( ) method or split( ) method. Accordingly, a reduction in the number of objects to be generated and an increase in the execution speed of the program can be expected.

In a case where the characteristic information indicates Example 3, when generating a state machine by compiling as the regular expression, for example, the programmer can make an implementation using an index table with a character code corresponding to 0 to 255, which are characters that can be expressed by eight-bit, instead of an implementation using a switch sentence having a large number of branches. Accordingly, because of the aforementioned implementation, the processing speed during execution of the program may be increased. Note that, the term used above, "when generating a state machine by compiling as the regular expression" refers to the generating of a program that performs state transition corresponding to the regular expression.

In a case where the characteristic information indicates Example 4, in java.net.URLDecoder.decode( ) method that takes, as an argument, the character string object to which the characteristic information is added, the processing to check the character string character by character and the processing to use String Buffer, which is a work buffer, may be omitted. Accordingly, the processing speed during execution of the program may be increased because of the aforementioned omission.

Figure 3A:
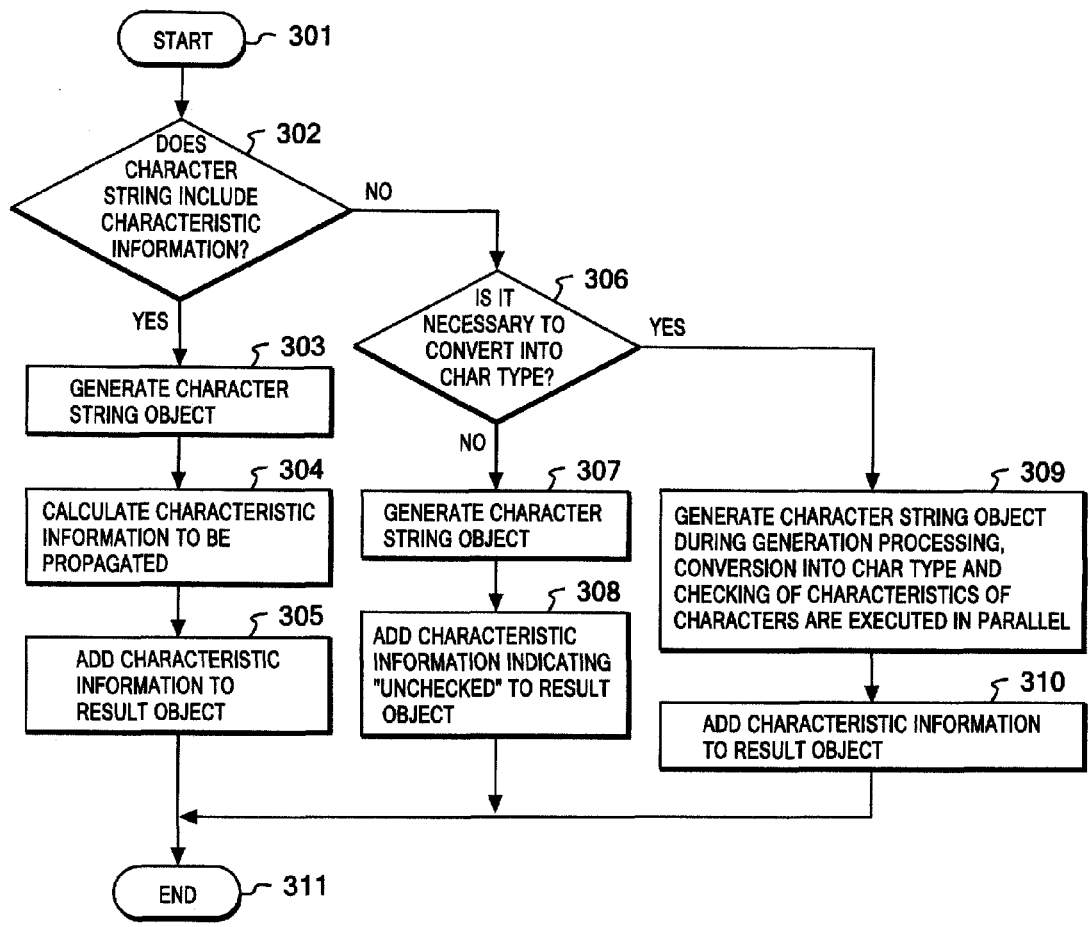
FIG. 3A shows a flowchart of processing to generate the character string object shown in FIG. 1 in the embodiment of the present invention.

FIG. 3A shows a flowchart of the processing to generate the character string object shown in FIG. 1 in the embodiment of the present invention.

The flowchart shown in FIG. 3A corresponds to First Mode described above. The processing of step 304 in FIG. 3A corresponds to the case where the characteristic information can be determined from the character string object (101), which is the generation source shown in First Mode. In addition, the processing of steps 309 and 310 in FIG. 3A correspond to the case where the characteristic information can be checked simultaneously with the sequential processing for the character string, which is the generation source shown in First Mode.

Step 301 indicates start of the processing to generate a character string object.

In step 302, the computer system determines whether or not a character string assigned to the character string object to be generated includes characteristic information. In a case where the character string includes characteristic information, the processing proceeds to step 303. In a case where the character string does not include characteristic information, the processing proceeds to step 306.

In step 303, the computer system generates a character string object from the aforementioned character string. In accordance with the end of the generation processing, the processing proceeds to step 304.

In step 304, the computer system calculates characteristic information to be transmitted to the generated character string object. As an aspect of the embodiment, the computer system calculates, as the characteristic information to be transmitted, the characteristic information included in the character string itself without any processing. As another aspect of the embodiment, the computer system calculates, as the characteristic information to be propagated, a result of logical product of the characteristic information included in the character string and characteristic information given to the character string object as the initial value. In accordance with the calculation processing, the processing proceeds to step 305. Note that, even in a case where the result of the calculation of the characteristic information to be propagated is "unknown," the processing proceeds to step 305.

In step 305, the computer system adds the calculated characteristic information to the generated character string object (result object). In accordance with the addition processing, the processing proceeds to step 311, and the processing to generate a character string object ends.

In step 306, the computer system determines whether or not the aforementioned character string needs to be converted into a char type. In Java (trademark) language, a character string literal is stored in a memory as a byte type data string. Accordingly, the computer system determines the aforementioned character string literal to be a character string that needs to be converted into a char type. Since the character string is one that needs to be converted into a char type, the processing proceeds to step 309. In a case where the character string is one that does not have to be converted into a char type, the processing proceeds to step 307.

In step 307, the computer system generates a character string object from the aforementioned character string. In the generation processing, the computer system assigns the aforementioned character string at once by use of a character string unit instead of assigning the character string by use of character units. In accordance with the end of the aforementioned generation processing, the processing proceeds to step 308.

In step 308, the computer system adds characteristic information indicating "unchecked" to the generated character string object (result object). In accordance with the end of the addition processing, the processing proceeds to step 311, and the processing to generate a character string object ends.

In step 309, the computer system generates a character string object from the aforementioned character string. In the generation processing, the computer system converts the aforementioned character string into a char type character by character, and then assigns the character string to the character string object. In addition, the computer system checks the characteristic of the character string character by character in parallel with the conversion processing, and then finds the characteristic information of the character string object from the results of the checking. In accordance with the end of the generation processing, the processing proceeds to step 310.

In step 310, the computer system adds the found characteristic information to the generated character string object (result object). In accordance with the end of the summation processing, the processing proceeds to step 311, and the processing to generate a character string object ends.

Figure 3B:
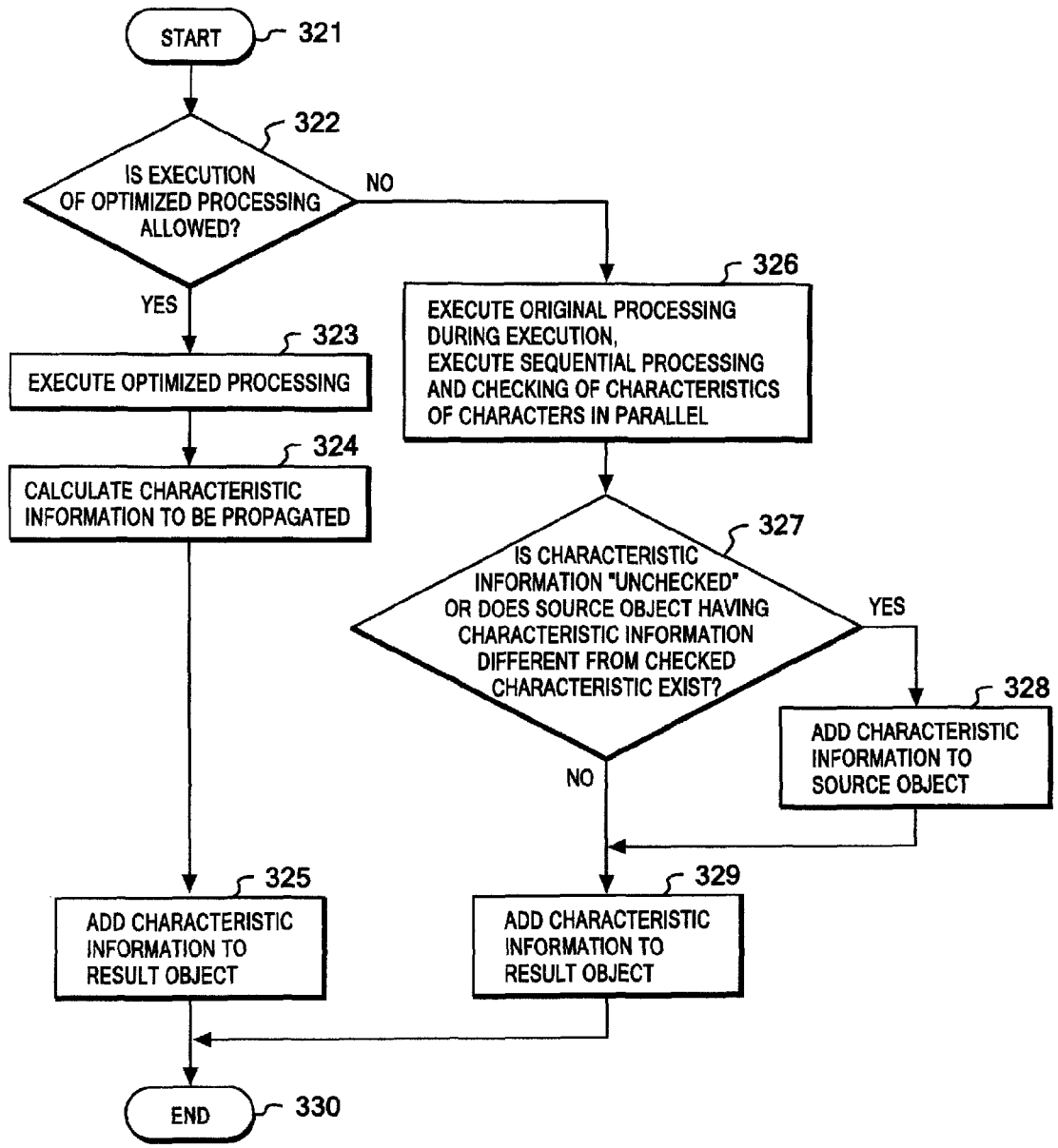
FIG. 3B shows a flowchart of operation that includes sequential processing to process a character string character by character in the embodiment of the present invention, the character string included in the character string object shown in FIG. 1.
Figure 3C:
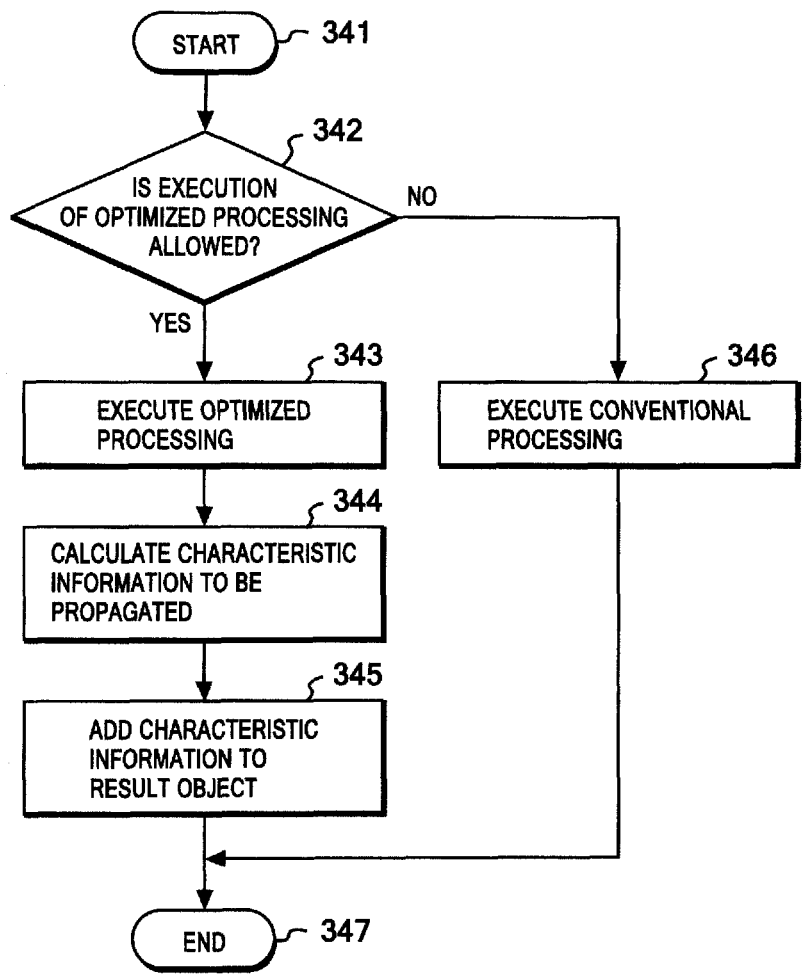
FIG. 3C shows a flowchart of operation that includes processing to process a character string at once in the embodiment of the present invention, the character string included in the character string object shown in FIG. 1.

FIGS. 3B and 3C are flowcharts each showing an example of a flowchart of the processing to execute the operation for a character string included in the character string object shown in FIG. 1 in the embodiment of the present invention.

FIG. 3B shows an example of a flowchart of the operation including sequential processing for a character string character by character (hereinafter, referred to as first character string processing), the character string included in the character string object shown in FIG. 1 in the embodiment of the present invention.

The first character string processing is processing resulting from adding, by the developer of the class library, the processing optimized in accordance with the characteristic information and the processing to add the characteristic information, to the original processing prepared in the library. The original processing is, for example, processing to perform sequential processing, character by character, for a character string included in at least one character string object (source object) received as an argument, and then to set the sequentially processed character string to be a character string included in at least different one character string object (result object).

The processing of steps 326 to 328 in FIG. 3B corresponds to Second Mode described above, and the processing of step 324 corresponds to Third Mode described above.

Step 321 indicates start of the first character string processing.

In step 322, the computer system determines whether or not a value that allows execution of the optimized processing is set in the characteristic information added to the source object. In a case where the value that allows execution of the optimized processing is set, the processing proceeds to step 323. In a case where the value that allows execution of the optimized processing is not set, the processing proceeds to step 326.

In step 323, the computer system executes the processing optimized in accordance with the aforementioned characteristic information. In accordance with the end of the execution, the processing proceeds to step 324.

In step 324, the computer system calculates characteristic information to be propagated to the result object. The calculation is performed using Third Mode. The method of the calculation differs depending on the contents of the aforementioned optimized processing. In a case where the optimized processing includes processing to convert an upper case character into a lower case character, for example, the computer system calculates characteristic information in which characteristic information indicating information "not including an upper case character" is added to the characteristic information included in the source object. In accordance with the calculation processing, the processing proceeds to step 325.

In step 325, the computer system adds the calculated characteristic information to the result object. In accordance with the addition processing, the processing proceeds to step 330, and the first character string processing ends.

In step 326, the computer system executes the sequential processing to process the character string character by character, which is the original processing, the character string included in the source object. In addition, the computer system checks, in parallel with the aforementioned sequential processing, the characteristics of the characters character by character, (hereinafter, referred to as first checking), the characters included in the character string included in the source object. In addition, the computer system checks the characteristic information of the result object (hereinafter, referred to as second checking). In accordance with the end of the aforementioned sequential processing, the first checking and the second checking, the processing proceeds to step 327.

In step 327, the computer system determines whether or not a source object to which the characteristic information indicating "unchecked" is added (hereinafter, referred to as a first source object) exists. The computer system further determines whether or not the source object found by the first checking (second source object) to which characteristic information different from the added characteristic information is added exists. In a case where the aforementioned first source object or the second source object exists, the processing proceeds to step 328. In a case where the first source object and the second source object do not exist, the processing proceeds to step 329.

In step 328, the computer system determines characteristic information to be added to the source object from the result of the first checking. Then, the computer system adds the determined characteristic information to the source object. In accordance with the end of the addition processing, the processing proceeds to step 329.

In step 329, the computer system finds characteristic information of the result object from the results of the first checking and the second checking. The computer system adds the found characteristic information to the result object. In accordance with the end of the addition processing, the processing proceeds to step 330, and the first character string processing ends.

Step 330 indicates end of the first character string processing.

FIG. 3C shows an example of a flowchart of the operation (hereinafter, referred to as second character string processing) including processing to process character strings collectively, the character strings included in the character string object shown in FIG. 1 in the embodiment of the present invention.

The second character string processing is processing resulting from adding, by the developer of the class library, the processing optimized in accordance with the characteristic information and the processing to add the characteristic information, to the original processing prepared in the library. The original processing is, for example, processing to collectively process character strings included in at least one character string object (source object) received as an argument, for example, and then to set the processed character strings to be character strings included in at least different one character string object (result object). The processing in step 344 in FIG. 3C corresponds to Third Mode.

Step 341 indicates start of the second character string processing.

In step 342, the computer system determines whether or not a value that allows execution of the optimized processing is set in the characteristic information added to the source object. In a case where the value that allows execution of the optimized processing is set, the processing proceeds to step 343. In a case where the value that allows execution of the optimized processing to be executed is not set, the processing proceeds to step 346.

In step 343, the computer system executes the processing optimized in accordance with the aforementioned characteristic information. In accordance with the end of the execution, the processing proceeds to step 344.

In step 344, the computer system calculates the characteristic information to be transmitted to the result object. The calculation processing is performed using Third Mode. The method of the calculation differs depending on the contents of the aforementioned optimized processing. In a case where the optimized processing includes processing to extract five characters from the top of the character string and also the characteristic information included in the source object indicates "including only an upper case character," for example, the computer system calculates the characteristic information to be transmitted to the characteristic information included in the source object. In accordance with the calculation processing, the processing proceeds to step 345.

In step 345, the computer system adds the calculated characteristic information to the result object. In accordance with the addition processing, the processing proceeds to step 347, and the second character string processing ends.

In step 346, the computer system executes the processing to collectively process the character strings included in the source object, which is the original processing. In accordance with the end of the aforementioned execution, the processing proceeds to step 347, and the second character string processing ends.

FIGS. 4A through 4F show program codes and state transition diagrams for describing an example of Example 1 described above in the embodiment of the present invention.

FIG. 4A shows a program code for describing the example of Example 1 described above in the embodiment of the present invention.

Hereinafter, descriptions will be given of a flow in which characteristic information is added when an object is generated and of an example of a case in which the processing optimized by the aforementioned addition processing is executed. The descriptions will be given with a program code 401 as an example.

When the computer system executes the program code (401), a new String ("ABC") is executed first. Here, the new String ("ABC") corresponds to the processing to generate an object, the processing in the flowchart shown in FIG. 3A is executed.

In step 302, since the character string "ABC" to be assigned to the character string object does not include characteristic information, the processing proceeds to step 306.

In step 306, since the character string "ABC" is literal and thus needs to be converted into a char type, the processing proceeds to step 309.

In step 309, the computer system generates a character string object s to which the character string "ABC" is assigned. In the generation processing, the computer system locates the character string "ABC" on a heap memory while converting the character string into a char type character by character. In addition, the computer system checks a characteristic of the character string "ABC" character by character in parallel with the aforementioned conversion processing. Here, suppose that the characteristic to be checked is a characteristic "not including a lower case character." Since the characters "A," "B" and "C" are not a lower case character according to the results of the checking, the computer system determines that the character string "ABC" is a character string not including a lower case character. Then, in accordance with the determination, a value indicating that "all of the characters do not include a lower case character" is found as the characteristic information of the character string object s. In accordance with the end of the generation processing, the processing proceeds to step 310.

In step 310, in a case where the value indicating that "all of the characters do not include a lower case character" is set to be "01," for example, the computer system adds the characteristic information "01" to the character string object s. In accordance with the end of the addition processing, the processing proceeds to step 311, and the processing to generate an object ends.

Upon completion of the processing to generate an object, toUpperCase( ) method is executed. The toUpperCase( ) method is a method for converting characters included in the character string into all upper case characters.

Here, suppose that the developer of the class library has added, to the implementation portion of the toUpperCase( ) method, an implementation to return a given character string as a return value without any processing in a case where the character string to which the characteristic information "01" is added, for example, is given to the toUpperCase( ) method. In a case where such an implementation is added, the computer system does not have to perform the original processing to convert the character string into upper case characters at all. The computer system can thus return, as a return value of the toUpperCase( ) method, without any processing, the character string "ABC," which is the given character string to which the characteristic information "01" is added. Accordingly, the processing of the toUpperCase( ) method can be executed at high speed.

FIG. 4B shows a program code for describing an example of Example 2 described above in the embodiment of the present invention.

The program code (411) is the implementation portion of replaceFirst( ) method. In original processing (412) of the replaceFirst( ) method, Pattern.compile( ) method is executed, and a large number of objects may be generated.

Here, in a case where a regular expression special character is not included in a character string to be passed by the argument of the replaceFirst( ) method, the processing to be executed by the aforementioned Pattern.compile( ) method can be replaced with processing using another method. The aforementioned regular expression special character refers to "+" indicating at least one repetition and "[" or "]" indicating start or end of the character range specification in the regular expression "[a-z]+[0-9]," for example, but the regular expression special character is not limited to these examples. The processing using another method is performed by a code obtained by combining indexOf( ) method and substring( ), for example. The processing to be executed by the code obtained by the aforementioned combination does not generate a large number of objects and may be executed at higher speed than the processing to be executed by the Pattern.compile( ) method.

Accordingly, the developer of the class library adds, to the replaceFirst( ) method, the code (412) of a case where the characteristic information of the character string passed by the argument indicates "not including a regular expression special character string." Because of the addition of the code (412), in a case where the character string passed by the argument does not include the regular expression, the replaceFirst( ) method may be executed at high speed as compared with the case where the original processing is executed.

Figure 4C:
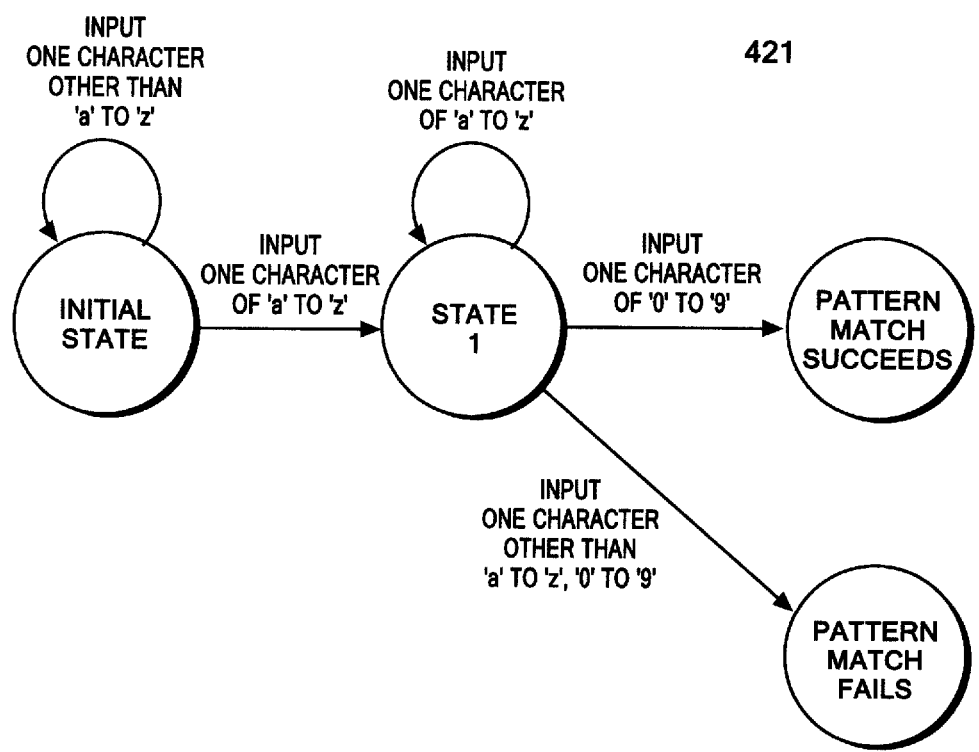
FIG. 4C shows a state transition diagram in relation to a program in the description of FIG. 4D below in the embodiment of the present invention.

FIG. 4C shows a state transition diagram in relation to a program in a description of FIG. 4D below in the embodiment of the present invention.

A state transition diagram (421) shows transition of a program code that performs pattern match for the regular expression "[a-z]+F[0-9]" included in a character string. When the programmer generates a state machine in which the aforementioned program code is implemented, the programmer can thereby generate a pattern match program that can perform processing for the regular expression "[a-z]+[0-9]" at higher speed than an original pattern match program.

FIG. 4D shows a program code for describing an example of Example 3 described above in the embodiment of the present invention.

The program code (431) is an example of the implementation of a state machine (refer to FIG. 4C) of a case where the character string to be passed by the argument is limited to eight-bit value. A program code (432) is an example of the implementation of the state machine of a case where the character string to be passed by the argument is not limited to eight-bit value. In a case where the character string to be passed by the argument is not limited to eight-bit value, the programmer achieves matching of characters included in the character string and the regular expression by an implementation using, for example, a case sentence as shown in the program code (432). In a case where the character string to be passed by the argument is limited to eight-bit value, the programmer may achieve the aforementioned matching by a simple loop using, for example, a for-sentence as shown in the program code (431), instead of using the implementation using the aforementioned case sentence.

FIG. 4E shows a program code for describing an example of Example 4 described above in the embodiment of the present invention.

The program code (441) is an example of a program code in which the embodiment of the present invention is applied to java.net.URLDecoder.decode( ) method. The original code (442) corresponds to the original processing, and added codes (443 to 446) correspond to the processing added for applying the embodiment of the present invention.

The java.net.URLDecoder.decode( ) method is a method that reads a character string character by character and then restores a special character of URL encode in the read character string to the original character. The java.net.URLDecoder.decode( ) method corresponds to the first character string processing.

When the java.net.URLDecoder.decode( ) method is executed, each processing in the flowchart shown in FIG. 3B is executed.

The processing of the added code (444) corresponds to the processing of step 322. In the added code (444), it is determined whether or not a value that allows execution of the optimized processing is set in the characteristic information included in a character string object s passed by the argument.

In a case where the characteristic information is a value indicating, "not including a special character in URL encode," for example, execution of the optimized processing is determined to be allowed. In a case where the character string does not include a special character in URL encode, "return s" corresponding to step 325 is executed since the processing corresponding to steps 323 and 324 do not exist in the java.net.URLDecoder.decode( ) method, and then, the java.net.URLDecoder.decode( ) method ends.

In a case where execution of the optimized processing is determined to be not allowed, the processing of the original code (442), which is the original processing corresponding to step 326, is executed. In the processing of the code (442), whether or not "+" and "%," which are special characters in URL encode, are included in a character string is checked character by character, the character string included in the character string object s. The result of the checking is set in variable needToChange. Note that, the aforementioned checking also functions as the first checking in the java.net.URLDecoder.decode( ) method. Accordingly, in a case where characteristic information is not added to the character string object s, the variable needToChange is used, and thereby, the characteristic information is set to the character string object s in the added code (445). The processing of the added code (445) corresponds to steps 327 and 328.

In addition, it is obvious that the result of the java.net.URLDecoder.decode( ) method does not include a special character in URL encode. Accordingly, in the added code (446), characteristic information indicating "not including a special character in URL encode" is set as a return value to the character string generated by sb.toString( ) The processing of the added code (446) corresponds to step 329.

In addition, in step 328, the characteristic information is added to the character string object s. Accordingly, the optimized processing may be executed when the URLDecoder.decode( ) method is executed again with the character string object s as an argument.

FIG. 4F shows an example of a program code for implementing the processing of the flowchart shown in FIG. 3A in the embodiment of the present invention.

Hereinafter, descriptions will be given of a flow in which characteristic information is added when an object is generated and of a flow in which the characteristic information is transmitted. The descriptions will be given with a program code 451 as an example.

When the computer system executes the program code (451), a new String ("ABC") is executed first. Here, since the new String ("ABC") corresponds to the processing to generate an object, each processing of the flowchart shown in FIG. 3A is executed.

In step 302, since the character string "ABC" to be assigned to a character string object does not include characteristic information, the processing proceeds to step 306.

In step 306, since the character string "ABC" is literal and thus needs to be converted into a char type, the processing proceeds to step 309.

In step 309, the computer system generates a character string object s1 to which the character string "ABC" is assigned. In the generation processing, the computer system converts the character string "ABC" into a char type character by character while locating the characters on a heap memory. In addition, the computer system checks a characteristic of the character string "ABC" character by character in parallel with the aforementioned conversion processing. Here, suppose that the characteristic to be checked is a characteristic "not including a lower case character." Since it is found that "A," "B" and "C" are not a lower case character as the result of the checking, the computer system determines that the character string "ABC" is a character string not including a lower case character. Then, because of the determination, a value indicating that "all characters do not include a lower case character" is found as the characteristic information of the character string object s1. In accordance with the end of the generation processing, the processing proceeds to step 310.

In step 310, when the aforementioned value indicating that "all characters do not include a lower case character" is set to be "01," for example, the computer system adds the characteristic information "01" to the character string object s1. In accordance with the end of the addition processing, the processing proceeds to step 311. The processing to generate the object s1 then ends.

Next, a new String ("XYZ") is executed. Here, since the new String ("XYZ") corresponds to the processing to generate an object, each processing of the flowchart shown in FIG. 3A is executed.

In step 302, since the character string "XYZ" to be assigned to a character string object does not include characteristic information, the processing proceeds to step 306.

In step 306, since the character string "XYZ" is literal and thus needs to be converted into a char type, the processing proceeds to step 309.

In step 309, the computer system generates a character string object s2 to which the character string "XYZ" is assigned. In the generation processing, the computer system converts the character string "XYZ" into a char type character by character while locating the characters on a heap memory. In addition, the computer system checks a characteristic of the character string "XYZ" character by character in parallel with the aforementioned conversion processing. Here, suppose that the characteristic to be checked is a characteristic "not including a lower case character." Since it is found that "X," "Y" and "Z" are not a lower case character as the result of the checking, the computer system determines that the character string "XYZ" is a character string not including a lower case character. Then, because of the determination, a value indicating that "all characters do not include a lower case character" is found as the characteristic information of the character string object s2. In accordance with the end of the generation processing, the processing proceeds to step 310.

In step 310, when the aforementioned value indicating that "all characters do not include a lower case character" is set to be "01," for example, the computer system associates the characteristic information "01" with the character string object s2. In accordance with the end of the association processing, the processing proceeds to step 311. The processing to generate the object s2 then ends.

Lastly, concat( ) method is executed. A String object including a character string "ABCXYZ" resulting from concatenating the character string in the character string object s1 and the character string in the character string object s2 is generated by execution of the concat( ) method. In addition, mergeAttr (attr, attr) previously prepared in the concat( ) method by the developer of the class library is called during the generation. The characteristic information pieces included in the character string objects s1 and s2 are both "01" indicating that "all characters do not include a lower case character." Accordingly, the logical summation "01" of "01" and "01" is added to the String object including the aforementioned character string "ABCXYZ." Then, the object is returned as a return value of s1.concat(s2).

Figure 5:
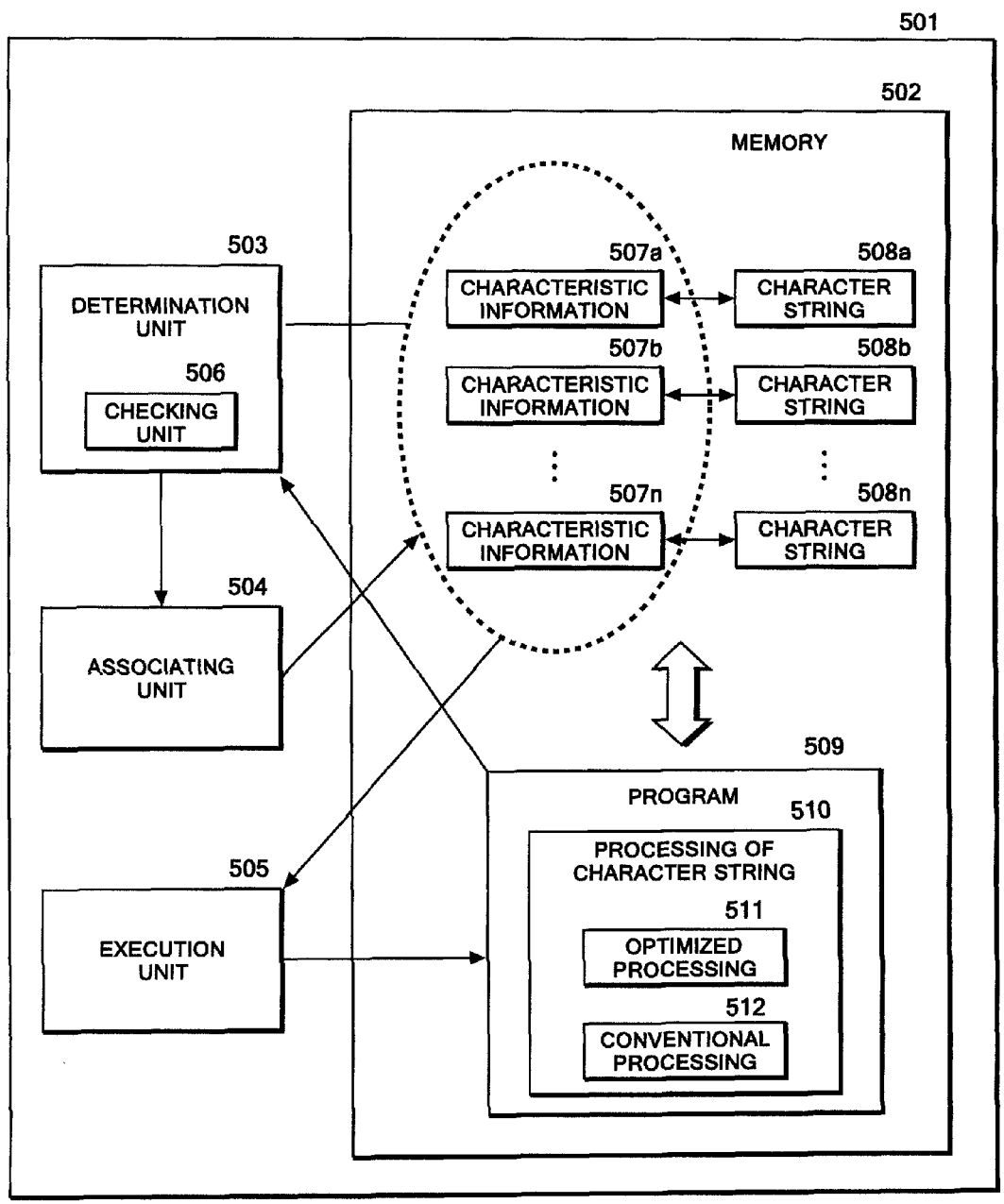
FIG. 5 shows an example of a functional block diagram illustrating functions included in a computer system that optimizes processing of a character string during execution of a program in the embodiment of the present invention.

FIG. 5 shows an example of a functional block diagram illustrating functions included in the computer system for optimizing processing of a character string during execution of a program in the embodiment of the present invention.

A computer system (501) includes a memory (502), a determination unit (503), an associating unit (504) and an execution unit (505).

The memory (502) is a main memory device having a storage area that an application can freely use. In the aforementioned storage area, a program (509), one or more character strings (508a to 508n) and one or more first characteristic information pieces (507a to 507n) corresponding to the character strings (508a to 508n), respectively, may be stored.

The program (509) is a program including processing (510) of at least one character string. The program (509) is read into the memory (502) by the computer system (501) and then executed by a central processing unit (CPU).

The processing (510) of a character string is processing including at least one optimized processing (511) and original processing (512).

The optimized processing (511) and the original processing (512) are processing to perform operation using the one or more character strings (508a to 508n).

The optimized processing (511) may be executed at higher-speed than the original processing (512) in a case where the optimized processing (511) is executed for a character string associated with a certain characteristic information piece.

The character strings (508a to 508n) are data assigned to the memory when the program (509) is executed. The character strings (508a to 508n) may be generated, referred, updated or deleted, for example, at the time of execution of the processing (510) of a character string. The characteristic information pieces (507a to 507n) are information pieces indicating the characteristics of the character strings (508a to 508n), respectively. The characteristic information pieces (507a to 507n) correspond to the character strings (508a to 508n), respectively.

In accordance with execution of operation for a first character string (508a), the determination unit (503) determines, on the basis of the characteristic of the first character string (508a) and the aforementioned operation, characteristic information corresponding to at least one character string among the first character string (508a) and a second character string (508b) which is the data resulting from the aforementioned operation.

The determination unit (503) includes a checking unit (506). In the aforementioned operation, in accordance with execution of sequential processing for the character strings (508a to 508n), the checking unit (506) finds the characteristics of the characters character by character, the characters being sequentially processed. The determination unit (503) determines, on the basis of the characteristics of the characters found by the checking unit (506), the characteristic information pieces (507a to 507n) respectively corresponding to the character strings (508a to 508n) for which the sequential processing is executed.

The associating unit (504) receives the determined characteristic information pieces from the determination unit (503) and then associates the characteristic information pieces with the first character string (508a) or the second character string (509a).

When the processing (510) of a character string, which includes the optimized processing (511), is executed, the execution unit (505) refers to the characteristic information pieces (507a to 507n) respectively corresponding to the character strings (508a to 508n) to be processed by the processing (510) of a character string. Then, if the referred characteristic information pieces (507a to 507n) satisfy a condition for the optimized processing (511) to be executed, the execution unit (505) causes the optimized processing (511) to be executed. If the referred characteristic information pieces (507a to 507n) do not satisfy a condition for the optimized processing (511) to be executed, the execution unit (505) causes the original processing (512), for example, to be executed.

Figure 6:
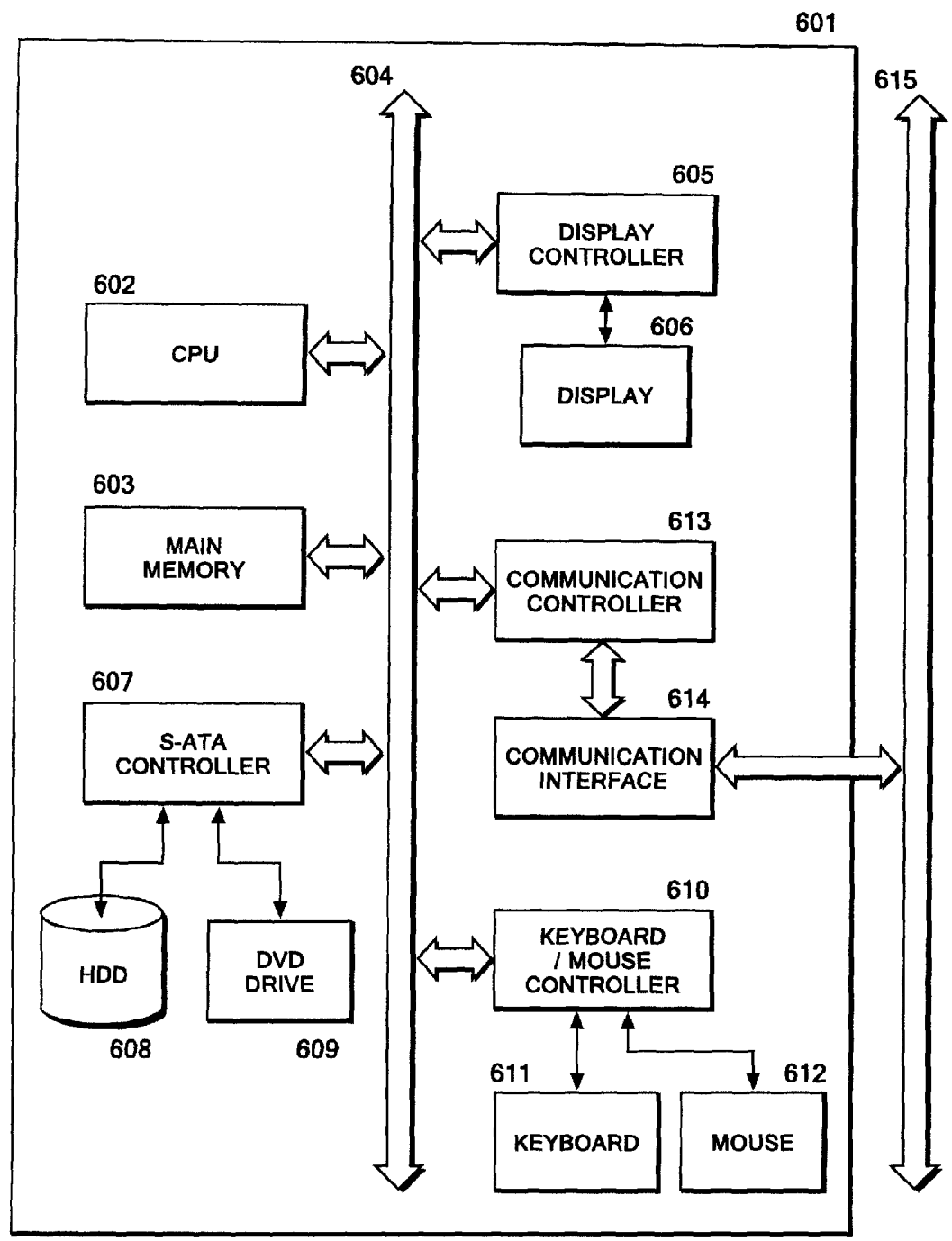
FIG. 6 is a hardware block diagram of the system shown in FIG. 5 in the embodiment of the present invention.

FIG. 6 shows a block diagram of the hardware configuration of the system shown in FIG. 5.

A computer system (601) includes a CPU (602) and a main memory (603), which are connected to a bus (604). The CPU (602) is preferably one based on a 32-bit or 64-bit architecture, and examples of the CPU that can be used include Xeon (trademark) series, Core (trademark) series, Atom (trademark) series, Pentium (trademark) series, Celeron (trademark) series from Intel, Inc. and Phenom (trademark) series, Athlon (trademark) series, Turion (trademark) series, and Sempron (trademark) series from Advanced Micro Devices, Inc. A display (606) such as an LCD monitor is connected to the bus (604) via a display controller (605). For the purpose of managing the computer system, the display (606) is used to display, via an appropriate graphic interface, information on the computer system connected to a network via a communication line and information on software operating on the computer system. A hard disk or silicon disk (608) and a CD-ROM, DVD drive, or BD drive (609) are connected also to the bus (604) via an IDE or SATA controller (607).

In the hard disk (608), an operating system, a program providing Java (trademark) processing environment such as J2EE, and other programs and data are stored so as to be loadable on the main memory.

The CD-ROM, DVD or BD drive (609) is used to additionally install a program onto the hard disk from a CD-ROM, DVD-ROM or BD as appropriate. A keyboard (611) and a mouse (612) are connected to the bus (604) via a keyboard/mouse controller (610).

A communication interface (614) is compliant with Ethernet (trademark) protocol, for example. The communication interface (614) is connected to the bus (604) via a communication controller (613) and serves the role to physically connect the computer system and a communication line (615). The communication interface (614) also provides a network interface layer for TCP/IP communication protocol of the communication function of the operating system of the computer system. Note that, the communication line may be a wired LAN environment, or a wireless LAN environment based on a wireless LAN connection standard such as IEEE802.11a/b/g/n, for example.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

According to the embodiment of the present invention, optimized processing executed at high-speed in accordance with the content of a character string or a value of the character string is dynamically selected and executed during execution of the program. Since the optimized processing is prepared in a class library, the execution speed of the program improves without lowering the productivity of the programmer.

Although the preferred embodiment of the present invention has been described in detail, it should be understood that various changes, substitutions and alternations can be made therein without departing from spirit and scope of the inventions as defined by the appended claims.

What is claimed is:

1. A method of optimizing processing of a character string during execution of a program, the method comprising:

performing, by a computer system, a first operation for a first character string in the program so as to obtain a second character string comprising multiple characters;

determining, by the computer system based on a characteristic of the first character string and on the first operation for the first character string, characteristic information for the second character string, the determining of the characteristic information for the second character string comprising:

executing a sequential processing of the first character string in the first operation; and checking characters to be sequentially processed simultaneously with the sequential processing thereby determining the characteristic information of the second character string;

associating, by the computer system, the characteristic information with the second character string;

storing, by the computer system, the characteristic information, which is associated with the second character string, in memory such that the characteristic information, as stored, is expressed as a bit string comprising multiple bits with each bit in the bit string corresponding to a different information piece that characterizes the second character string as a whole and not individual characters within the second character string;

and performing, by the computer system, a second operation for the second character string in the program, the performing of the second operation being in accordance with the character information associated with the second character string, thereby optimizing the performing of the second operation.

2. The method according to claim 1, further comprising:

determining, by the computer system based on the characteristic of the first character string and on the first operation for the first character string, additional characteristic information for the first character string;

associating, by the computer system, the additional characteristic information with the first character string;

storing, by the computer system, the additional characteristic information, which is associated with the first character string, in the memory; and performing, by the computer system, an additional operation for the first character string in the program, the performing of the additional operation being in accordance with the additional character information associated with the first character string, thereby optimizing the performing of the additional operation.

3. The method according to claim 1, the performing of the first operation comprising processing to generate the second character string to which the first character string is assigned and the executing of the sequential processing comprising processing the first character string character by character during the generation of the second character string.

4. The method according to claim 2, the determining of the additional characteristic information comprising:

executing a sequential processing of the first character string; and checking characters to be sequentially processed in parallel with the sequential processing thereby determining the additional characteristic information of the first character string, the performing of the first operation comprising the sequential processing to process the first character string character by character and the additional characteristic information for the first character string any one of unknown and unassociated with the first character string before the performing of the first operation.

5. The method according to claim 1, the bit string comprising:

a first bit corresponding to a first information piece indicating whether the second character string includes an upper case character;

a second bit corresponding to a second information piece indicating whether the second character string includes a lower case character; and, an additional bit corresponding to an additional information piece indicating any one of the following: whether the second character string includes a numerical character and whether the second character string includes another type of character different from said upper case character, said lower case character and said numerical character.

6. The method according to claim 1, wherein the characteristic information comprises at least one first information piece indicating whether or not the character string includes a character that belongs to a character set, or indicating whether or not the character string includes the character is unknown and a second information piece indicating whether or not the character string includes a character that does not belong to the character set, or indicating that whether or not the character string includes the character is unknown.

7. The method according to claim 6, wherein (i) the character set is a second character set collectively indicating at least two first character sets, (ii) each of the at least two first character sets includes characters all different from each other, (iii) the first information piece indicates whether or not the character string includes a character that belongs to each of the first character sets, or indicating that whether or not the character string includes the character is unknown and (iv) the second information piece indicates whether or not the character string includes a character that does not belong to all of the first character sets, or indicating that whether or not the character string includes the character is unknown.

8. The method according to claim 6, wherein (i) the character set is a second character set collectively indicating at least two first character sets, (ii) each of the at least two first character sets includes characters all different from each other, (iii) the first information piece indicates whether or not the character string includes a character that belongs to the second character set, or indicates that whether or not the character string includes the character is unknown and (iv) the second information piece indicates whether or not the character string includes a character that does not belong to the second character set, or indicates that whether or not the character string includes the character is unknown.

9. The method according to claim 6, wherein the first information piece and the second information piece are expressed by said bit string, and each bit corresponds to one of character sets or a set of characters that do not belong to any of the character sets.

10. The method according to claim 9, the performing of the first operation comprising concatenating two first character strings, one of the two first character strings being associated with the first information piece and another of the two first character strings being associated with the second information piece, and the characteristic information of the second character string being found by logical summation of the first information piece and the second information piece.

11. The method according to claim 9, the performing of the first operation comprising deleting one of two first character string associated with the second information piece from another of two first character strings associated with the first information piece such that the characteristic information of the second character string is the first information piece.

12. The method according to claim 9, the performing of the first operation comprising deleting one first character string associated with the second information piece from another first character string associated with the first information piece, and the determining further comprising in a case where the first operation excludes a character that belongs to a character set indicated by the second information piece from the first character string associated with the first information piece, determining that additional characteristic information found by logical product of the first information piece and the second information piece for the first character string.

13. The method according to claim 1, further comprising, during the second operation, making a judgment based on the characteristic information.

14. The method according to claim 6, wherein the character set indicates at least one character set selected from a group consisting of a set of upper case characters, a set of lower case characters, a set of numerical characters, a set of double-byte characters, a set of roman characters, a set of characters in a same type of character code, a set of regular expression special characters, a set of characters expressible by eight-bit and a set of special characters in URL encode.

15. The method according to claim 1, the first operation comprising processing to generate at least one second character string to which at least one first character string is assigned and the characteristic information of the second character string being determined from known characteristic information of the at least one first character string.

16. The method according to claim 1, the first operation comprising processing to generate the second character string and processing to assign at least one first character string to the second character string character by character during the generation, and the characteristic information being determined by (i) executing the assignment processing, and (ii) checking the characters to be assigned in parallel with the assignment processing thereby determining the characteristic information for the second character string.

17. The method according to claim 1, wherein, if the character string is treated as an object in a programming language, the operation for the character string is an operation for the object and the characteristic information is included in the object.

18. A computer system that executes a program and optimizes processing of a character string during execution of the program the computer system comprising:
a memory storing the program; and
a processor performing a first operation for a first character string in the program so as to obtain a second character string comprising multiple characters;
the processor further comprising:
a determination unit that determines, based on a characteristic of the first character string and based on the first operation for the first character string, characteristic information for the second character string by executing a sequential processing of the first character string in the first operation and checking characters to be sequentially processed simultaneously with the sequential processing thereby determining the characteristic information of the second character string; and
an associating unit that associates the characteristic information with the second character string,
the memory further storing the characteristic information, which is associated with the second character characteristic string, such that the characteristic information, as stored, is expressed as a bit string comprising multiple bits with each bit in the bit string corresponding to a different information piece that characterizes the second character string as a whole and not individual characters within the second character string, and
the processor further performing a second operation for the second character string in the program, the performing of the second operation being in accordance with the character information associated with the second character string, thereby optimizing the performing of the second operation.

19. A computer program product comprising a non-transitory program storage device storing computer readable instructions, the instructions being readable by a computer for performing a method of processing a character string, the method comprising:
performing a first operation for a first character string in the program so as to obtain a second character string comprising multiple characters;
determining based on a characteristic of the first character string and on the first operation for the first character string, characteristic information for the second character string, the determining of the characteristic information for the second character string comprising:
executing a sequential processing of the first character string in the first operation; and
checking characters to be sequentially processed simultaneously with the sequential processing thereby determining the characteristic information of the second character string;
associating the characteristic information with the second character string;
storing the characteristic information, which is associated with the second character string, in memory such that the characteristic information, as stored, is expressed as a bit string comprising multiple bits with each bit in the bit string corresponding to a different information piece that characterizes the second character string as a whole and not individual characters within the second character string; and
performing a second operation for the second character string in the program, the performing of the second operation being in accordance with the character information associated with the second character string, thereby optimizing the performing of the second operation.

* * * * *